United States Patent
Hosokawa et al.

(10) Patent No.: US 11,248,915 B2
(45) Date of Patent: Feb. 15, 2022

(54) INFORMATION PROCESSING APPARATUS AND INFORMATION PROCESSING SYSTEM

(71) Applicant: DENSO CORPORATION, Kariya (JP)

(72) Inventors: Mamoru Hosokawa, Kariya (JP); Takashi Uefuji, Kariya (JP); Yasuyuki Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 16/565,258

(22) Filed: Sep. 9, 2019

(65) Prior Publication Data

US 2020/0003566 A1    Jan. 2, 2020

Related U.S. Application Data

(63) Continuation of application No. PCT/JP2018/011752, filed on Mar. 23, 2018.

(30) Foreign Application Priority Data

Mar. 24, 2017    (JP) .............................. JP2017-059141

(51) Int. Cl.
*G01C 21/32*    (2006.01)
*G06F 16/29*    (2019.01)
(Continued)

(52) U.S. Cl.
CPC .............. *G01C 21/32* (2013.01); *G06F 16/29* (2019.01); *G06K 9/00798* (2013.01);
(Continued)

(58) Field of Classification Search
CPC .. G08G 1/056; G08G 1/09623; G08G 1/0112; B60W 30/18154;
(Continued)

(56) References Cited

U.S. PATENT DOCUMENTS 10,558,224 B1 * 2/2020 Lin .................... G08G 1/165
2012/0008860 A1   1/2012 Hirota et al.
(Continued)

FOREIGN PATENT DOCUMENTS

JP    2005267472 A    9/2005
JP    2008039687 A    2/2008
(Continued)

OTHER PUBLICATIONS

Translation used of JP publication JP 2011022004 (Year: 2011).*

*Primary Examiner* — Kenneth J Malkowski
(74) *Attorney, Agent, or Firm* — Harness, Dickey & Pierce, P.L.C.

(57) ABSTRACT

An information processing apparatus that is communicable with an in-vehicle device includes a detection section to detect a change of a specific feature at every predetermined timing based on probe information, the specific feature being a feature on a road and used in control of automated driving. The detection section includes a first calculation section to calculate a first index based on the probe information; a second calculation section to calculate a second index based on the probe information; and a comparison section to detect a change of the specific feature by comparing the first index and the second index.

9 Claims, 10 Drawing Sheets

(51) Int. Cl.
*H04W 4/40* (2018.01)
*G06K 9/00* (2022.01)

(52) U.S. Cl.
CPC ..... *G06K 9/00818* (2013.01); *G06K 9/00825* (2013.01); *H04W 4/40* (2018.02)

(58) Field of Classification Search
CPC ....... B60W 30/18159; B60W 2540/20; B60W 30/18145; G06K 9/00791; G06K 9/00798; G06K 9/00825; G06K 9/00818; G01C 21/32; G06F 16/29; H04W 4/40
See application file for complete search history.

(56) References Cited

U.S. PATENT DOCUMENTS

| | | | |
|---|---|---|---|
| 2012/0173150 A1* | 7/2012 | Romero | G01S 13/885 702/14 |
| 2015/0210274 A1* | 7/2015 | Clarke | G08G 1/167 382/104 |
| 2015/0317900 A1 | 11/2015 | Tashiro et al. | |
| 2016/0258764 A1* | 9/2016 | Phuyal | G09B 29/007 |
| 2017/0008522 A1 | 1/2017 | Sato et al. | |
| 2017/0039853 A1* | 2/2017 | Chambers | G08G 1/163 |
| 2017/0084174 A1* | 3/2017 | Suzuki | B60W 30/00 |
| 2017/0160746 A1* | 6/2017 | Rao | B61L 15/0081 |
| 2017/0193384 A1* | 7/2017 | Mudalige | G08G 1/166 |
| 2017/0225686 A1* | 8/2017 | Takaso | B60W 30/12 |

FOREIGN PATENT DOCUMENTS

| | | |
|---|---|---|
| JP | 2008293277 A | 12/2008 |
| JP | 2009193347 A | 8/2009 |
| JP | 2011022004 A | 2/2011 |
| JP | 2011141747 A | 7/2011 |
| JP | 2012016454 A | 1/2012 |
| JP | 2012224247 A | 11/2012 |
| JP | 2013030006 A | 2/2013 |
| JP | 2014153236 A | 8/2014 |
| JP | 2016-194815 A | 11/2016 |
| JP | 2017013749 A | 1/2017 |
| WO | WO-2006101012 A1 | 9/2006 |

* cited by examiner

| LATITUDE | LONGITUDE | DATE AND TIME RECORDED | SPEED | ... | ROAD LINK ID |
|---|---|---|---|---|---|
| 34.595200 | 137.001700 | 2016-02-25 00:21:48.00 | 1.2 | ... | 1 |
| 34.595200 | 137.001700 | 2016-02-25 00:21:49.00 | 0 | ... | 1 |
| 34.595200 | 137.001700 | 2016-02-25 00:21:50.00 | 0 | ... | 1 |

INFORMATION PROCESSING APPARATUS AND INFORMATION PROCESSING SYSTEM

CROSS REFERENCE TO RELATED APPLICATION

The present application is a continuation application of international Patent Application No. PCT/JP2018/011752 filed on Mar. 23, 2018, which designated the U.S. and claims the benefit of priority from Japanese Patent Application No. 2017-059141 filed on Mar. 24, 2017. The entire disclosures of all of the above applications are incorporated herein by reference.

TECHNICAL FIELD

The present disclosure relates to an information processing apparatus communicable with an in-vehicle device.

BACKGROUND

A technique determining the presence or absence of a traffic light at an intersection on the basis of probe information has been known.

SUMMARY

The present disclosure describes an information processing apparatus that is communicable with in-vehicle devices installed in vehicles. The information processing apparatus includes a detection section that is configured to detect a change of a specific feature at every predetermined timing based on probe information acquired by the in-vehicle devices, the specific feature being a feature on a road and used in control of automated driving.

DETAILED DESCRIPTION

The development of automated driving apparatuses for performing driving operation automatically in part or in whole is being pursued. Automated driving uses information on various features, such as a traffic light and the like. The inventors of the present application have found that it may be desired to swiftly acquire changes of such features.

The present disclosure describes a technology that swiftly acquires information required for automated driving.

One aspect of the present disclosure is an information processing apparatus that is communicable with a plurality of in-vehicle devices installed in a plurality of vehicles. The information processing apparatus may include a detection section that is configured to detect a change of a specific feature at every predetermined timings based on probe information acquired by the in-vehicle devices, the specific feature being a feature on a road and used in control of automated driving.

The detection section may include a first calculation section, a second calculation section, and a comparison section. The first calculation section is configured to calculate a first index that is an index related to a situation of the specific feature, based on the probe information acquired in a first period. The second calculation section is configured to calculate a second index that is an index related to the situation of the specific feature, based on the probe information acquired in a second period that is earlier than the first period. The comparison section is configured to detect a change of the specific feature by comparing the first index and the second index.

According to this configuration, it may be possible to detect a change of a specific feature at every predetermined timing. It may be possible to swiftly acquire information to be used in automated driving.

Another aspect of the present disclosure describes an information processing system including the information processing apparatus and an in-vehicle device that is installed in a vehicle and transmits probe information to the information processing apparatus at every predetermined timing.

According to this information processing system, it may be possible to swiftly acquire information to be used in automated driving.

Embodiments of the present disclosure are described below with reference to the drawings.

1. FIRST EMBODIMENT

1-1. Configuration

Figure 1:
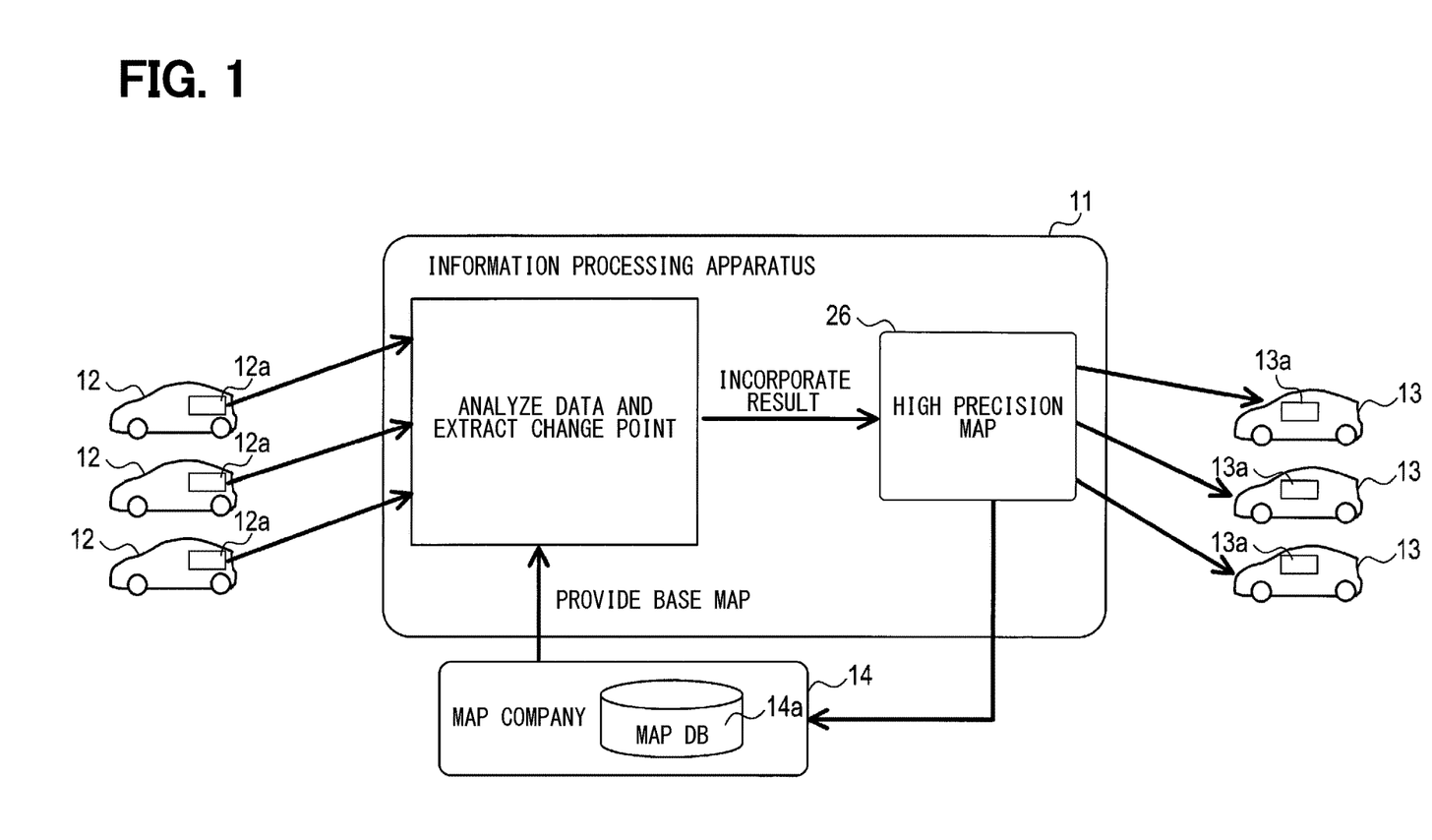
FIG. 1 is a block diagram of a schematic configuration of an information processing system according to a first embodiment.

An information processing system 1 illustrated in FIG. 1 is configured mainly using an information processing apparatus 11. The information processing system 1 includes in-vehicle devices 12a installed in probe cars 12 and in-vehicle devices 13a installed in automated vehicles 13. The probe cars 12 correspond to vehicles in the present disclosure.

Functions of the information processing system 1 are described below in outline. When receiving probe information from the in-vehicle devices 12a, the information processing apparatus 11 analyzes data of the probe information and detects a change point on a map.

A change point refers to a point at which a specific feature has been changed. Specific features are located on roads and used for control in automated driving. Examples of the specific feature include an object placed on or along a road, or a specific area in a road.

A change point that is detected is reflected into a high precision map 26 provided in the information processing apparatus 11, and is distributed to the in-vehicle devices 13a.

The high precision map 26 that has the change point reflected is transmitted to a map company 14 and stored in a map database (hereinafter referred to as a map DB) 14a. The map company 14 provides the information processing apparatus 11 with the map DB 14a that serves as a base.

Probe information is information that is acquired while the vehicles are traveling in the field. The probe information may include information related to a driving condition of the vehicle, information acquired by various sensors, images captured by a camera for imaging the inside and outside of the vehicle, and other various information that can be acquired by the vehicle. Information used for the detection of a change point may be a portion of the probe information.

The high precision map 26 includes not only map information but also various types of information for use in control of automated driving. Information of specific features is included in the high precision map 26 according to the present embodiment.

The probe car 12 and the automated vehicle 13 may be an identical vehicle. The automated driving of the automated vehicle 13 includes not only automated driving that requires no operation by an occupant of the vehicle for a certain period of time but also temporary driving assistance performed for collision avoidance and the like.

Figure 2:
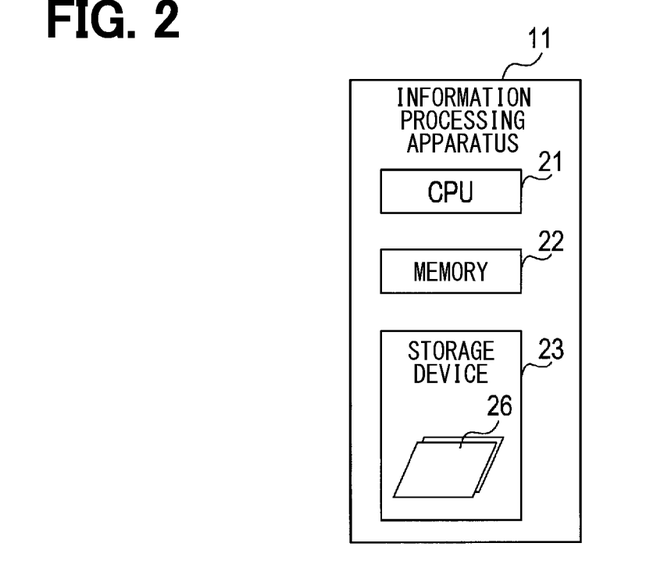
FIG. 2 is a block diagram of a configuration of an information processing apparatus according to the first embodiment.

The information processing apparatus 11 is a server apparatus configured to be capable of communicating with the in-vehicle devices 12a and the in-vehicle devices 13a. As illustrated in FIG. 2, the information processing apparatus 11 includes a computer system that includes a CPU 21, a semiconductor memory (hereinafter referred to as a memory 22), such as a RAM, a ROM, and a flash memory, and a storage device 23 that has a large storage capacity, such as a hard disk. The information processing apparatus 11 performs its functions when the CPU 21 executes programs stored in a non-transitional tangible storage medium. In this example, the memory 22 corresponds to the non-transitional tangible storage medium that stores the programs. When a program is executed, a method associated with the program is performed. The number of microcomputers included in the information processing apparatus 11 may be one or more. The high precision map 26 is stored in the storage device 23.

Figure 3:
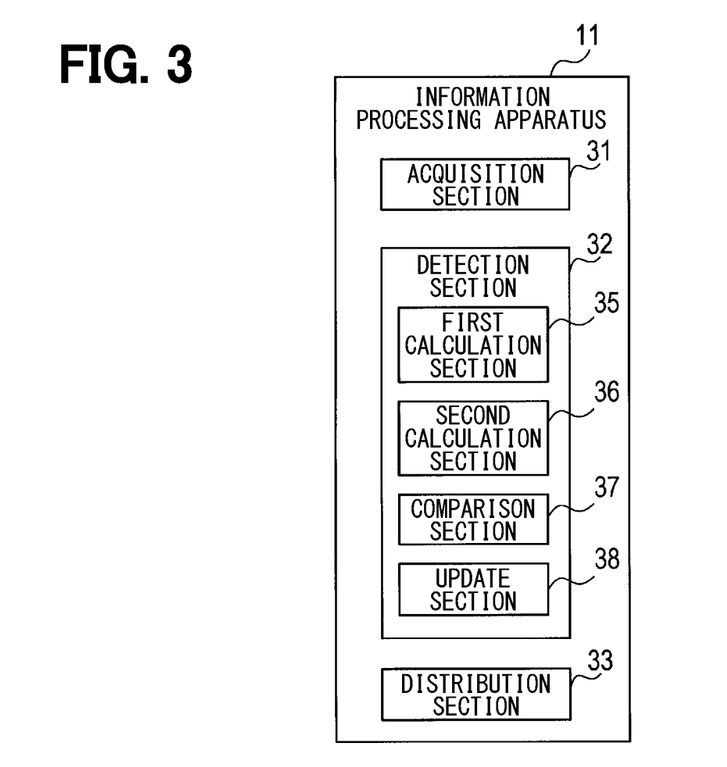
FIG. 3 is a functional block diagram of the information processing apparatus according to the first embodiment.

As illustrated in FIG. 3, the information processing apparatus 11 includes, as configurations of functions performed when the CPU 21 executes the programs, an acquisition section 31, a detection section 32, and a distribution section 33. The detection section 32 includes a first calculation section 35, a second calculation section 36, a comparison section 37, and an update section 38. A method for achieving these elements included in the information processing apparatus 11 is not limited to that using software. The elements in part or in all may be achieved by using one or more pieces of hardware. For example, when the functions described above are achieved by using an electronic circuit, which is hardware, the electronic circuit may be achieved by using a digital circuit that includes many logical circuits, an analog circuit, or a combination thereof.

The acquisition section 31 acquires probe information from the in-vehicle devices 12a of the probe cars 12.

The detection section 32 detects a change of a specific feature at a preset cyclic timing, based on the probe information acquired by the in-vehicle devices 12a.

The distribution section 33 distributes information on the change of the specific feature detected by the detection section 32 to the in-vehicle devices 13a of the automated vehicles 13. For example, the distribution section 33 may distribute information on a lane or traffic light that has been added, together with the location thereof, and the in-vehicle devices 13a may process the information into a usable form. Alternatively, the distribution section 33 may update map information that includes information on the specific feature and distribute the updated map information. In other words, information on a change of a specific feature may be information directly indicating addition or removal of the specific feature, or information that has the change of the specific feature reflected, such as updated map information. In the present embodiment, updated map information is distributed.

The first calculation section 35 calculates a first index that is an index related to a situation of a specific feature, based on probe information that is acquired in a first period. The first period is defined with reference to the present point in time. The second calculation section 36 calculates a second index that is an index related to a situation of the specific feature, based on probe information that is acquired in a second period. The second period is earlier than the first period.

An index related to a situation of a specific feature quantitatively indicates predetermined information related to the specific feature, based on probe information acquired in a certain period. For example, when probe information concerning a change of a vehicle condition is used, the index may be the number of times the condition has changed, the number of times a predetermined condition has been present, the percentage of time when the predetermined condition has been present, or the like. Examples of the probe information concerning a change of a vehicle condition include information indicating a change of a condition that is caused by, for example, a predetermined operation by a driver or actuation of a device installed in the vehicle. As another example, when probe information concerning physical and temporal length is used, the index may be a mean value, a maximum value, a median value, a mode, or the like. The mean value, the maximum value, the median value, the mode, and the like are obtained by various methods.

The first period may be, for example, a period defined with reference to the present point in time. For example, the first period may be ended at the present time. Specifically, the first period may be defined as a period from the same time as the present on a day seven days ago until the present time. Alternatively, the first period may be a past certain period defined with reference to the present point in time, such as, for example, the previous day, the previous week, or the previous month.

The second period may be a period that is determined as a period earlier as a whole than the first period. While the length of the second period is not particularly limited, it may be preferably equal to or longer than the first period in some cases. For example, when the first period is the whole previous day with reference to the present point in time, the second period may be a period from a month ago until the day before the previous day. Alternatively, when the first period is the previous month, the second period may be the month before that. There may be an interval between the first period and the second period. Alternatively, a portion or all of the first period may be included in the second period. When, for example, the first period is the previous week and the second period is the previous month, all of the first period is included in the second period. The information of the first period is newer from the viewpoint of the newness of the probe information as the whole period.

In the present embodiment, the first period is defined as a previous day and the second period is defined as six days from seven days ago until two days ago, as an example.

The comparison section 37 detects a change of a specific feature by comparing the first index and second index concerning an identical specific feature. A specific method for detecting a change may be arbitrarily defined according to the type of the specific feature or the form of the index. For example, when an amount of change of an index is equal to or greater than a predetermined threshold value, it may be determined that the specific feature has been changed.

The update section 38 updates the high precision map 26, based on the change of the specific feature detected by the comparison section 37.

The in-vehicle device 12a is configured to be communicable with the information processing apparatus 11 and to acquire the probe information. The in-vehicle device 12a is connected to, for example, a device for acquiring an operating condition of a device installed in the corresponding probe car 12, a sensor for measuring an operation condition of a driver, vehicle speed, weather, temperature, or the like, and a camera for imaging the outside of the corresponding vehicle. The in-vehicle device 12a transmits information acquired from these devices to the information processing apparatus 11. Examples of the operating condition of a device described above include an operational state of a lamp and activation of a wiper. Examples of the operation condition of a driver described above include a steering angle and application of a brake.

The in-vehicle device 13a is configured to be communicable with the information processing apparatus 11. The in-vehicle device 13a is also configured to be communicable with a publicly known automated driving control apparatus that executes the automated driving of the corresponding automated vehicle 13.

The method of communication between the information processing apparatus 11 and the in-vehicle device 12a and between the information processing apparatus 11 and the in-vehicle device 13a, and a communication device used therefor are not particularly limited.

The information processing apparatus 11 is also configured to be communicable with the map company 14. When the high precision map 26 is changed, the information processing apparatus 11 transmits the updated high precision map 26 to the map company 14. The map company 14 reflects the provided information into the map DB 14a.

1-2. Processing

Processing of the In-Vehicle Device of the Probe Car

Figure 4:
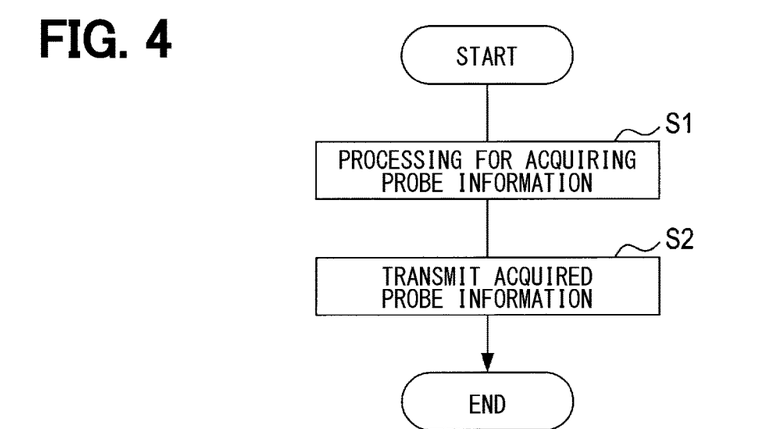
FIG. 4 is a flowchart for information transmission processing according to the first embodiment.

Information transmission processing of the in-vehicle device 12a is described below with reference to a flowchart in FIG. 4. This processing is performed at a certain cycle. This cycle may be a sufficiently short period (for example, five seconds) in comparison with the first period or the like, which are described above.

The in-vehicle device 12a acquires in S1 probe information.

The in-vehicle device 12a transmits in S2 the probe information acquired in S1 to the information processing apparatus 11. The processing is finished after S2.

Alternatively, the in-vehicle device 12a may accumulate probe information 207 for a certain period and transmit the accumulated probe information altogether to the information processing apparatus 11, instead of transmitting the probe information to the information processing apparatus 11 every time it is acquired.

Processing of the Information Processing Apparatus

Figure 5:
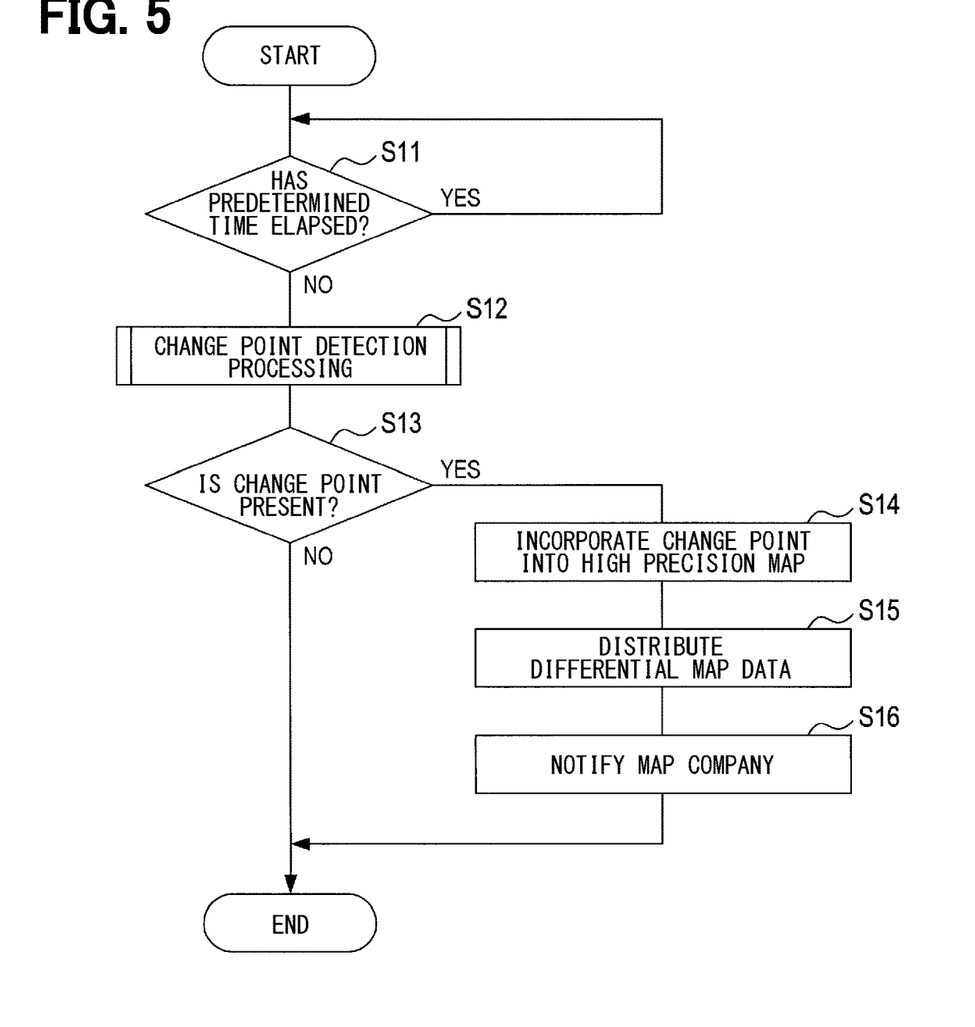
FIG. 5 is a flowchart for map update processing according to the first embodiment.

Map update processing of the information processing apparatus 11 is described next with reference to a flowchart in FIG. 5.

The CPU 21 of the information processing apparatus 11 determines in S11 whether a predetermined time has elapsed since change point detection processing performed the last time in S12, which is described below. This predetermined time is a cycle in which the change point detection processing is performed. This cycle may be set such that sufficient probe information is acquired and the pace of update of the high precision map 26 is not excessively slow. If the predetermined time has not elapsed since the change point detection processing performed the last time, S11 is performed again and the processing is put on standby until the predetermined time elapses. If the predetermined time has elapsed since the change point detection processing performed the last time, the processing proceeds to S12.

The CPU 21 performs in S12 the change point detection processing based on the probe information that has been transmitted. The change point detection processing is described in detail below.

The CPU 21 determines in S13 whether a change point of a specific feature is present based on a result of S12. If no change point is present, the processing is finished. If a change point is present, the processing proceeds to S14.

At S14, the CPU 21 reflects the change point into the high precision map 26 of the information processing apparatus 11. In other words, the update section 38 updates the high precision map.

The CPU 21 distributes in S15 differential map data, that is, a portion of the map data that has been updated, to the automated vehicles 13.

The CPU 21 notifies in S16 the map company of the reflection of the change into the high precision map. Then, the processing returns to S11.

Figure 6:
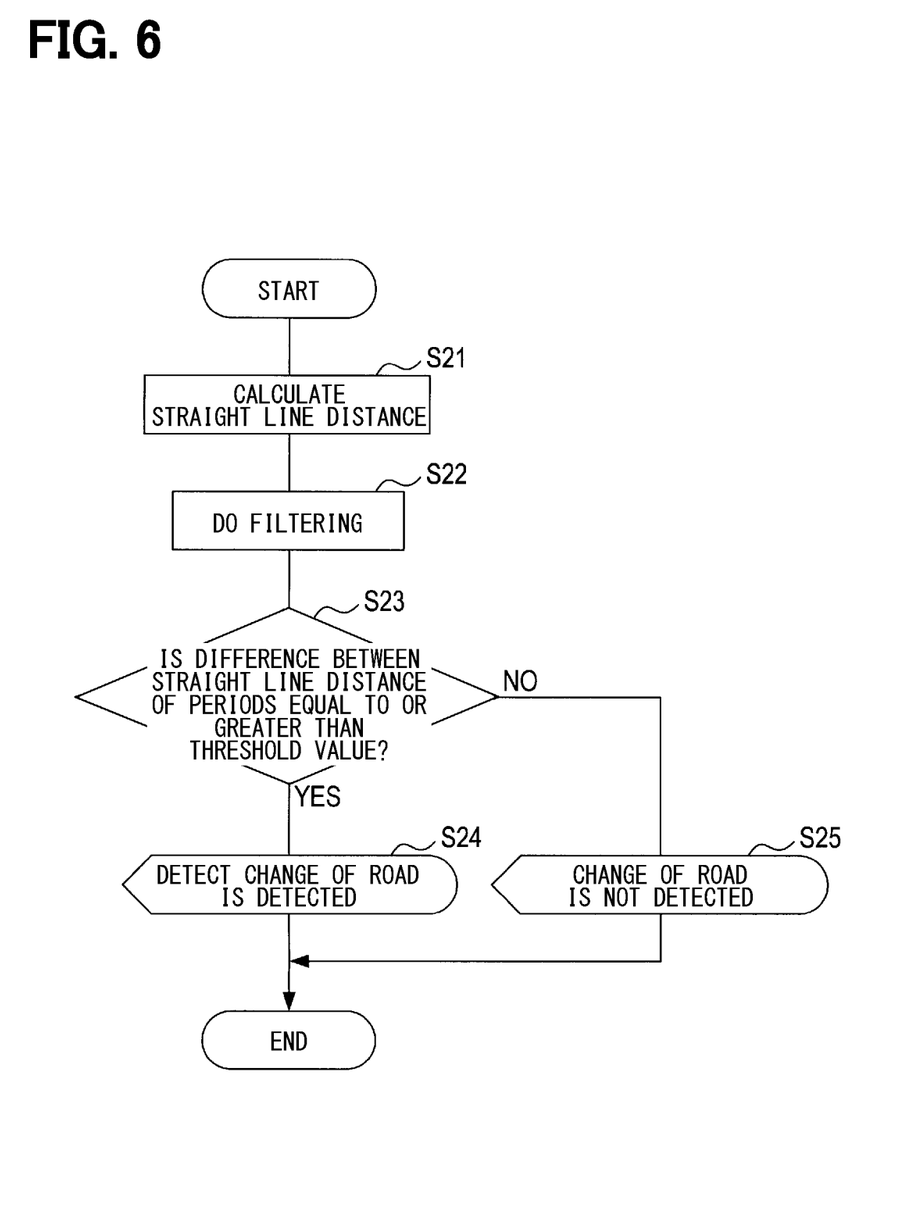
FIG. 6 is a flowchart for change point detection processing according to the first embodiment.

The change point detection processing performed by the CPU 21 of the information processing apparatus 11 is described next with reference to a flowchart in FIG. 6. In the present embodiment, addition or removal of a dedicated right turn lane, which is for vehicles to make a right turn at an intersection, is detected. The detection is performed based on a change of a location at which an operational state of a direction indicator of the vehicle is started when the vehicle makes the turn at the intersection.

The CPU 21 calculates in S21 a straight-line distance between two locations where the vehicle has traveled with a direction indicator thereof in the operational state.

A specific method for calculating the distance described above is described below with reference to FIG. 7. A road 101 is for left-hand traffic and has a dedicated right turn lane 102 extending to an intersection. The road 101 is segmented into links 104 by link end points 103. The links 104 are identified by link IDs. It is assumed here that the vehicle travels on the road along link IDs=99 and 100 and then turns right into the road of a link ID=500, from the left to right in FIG. 7.

Figure 7:
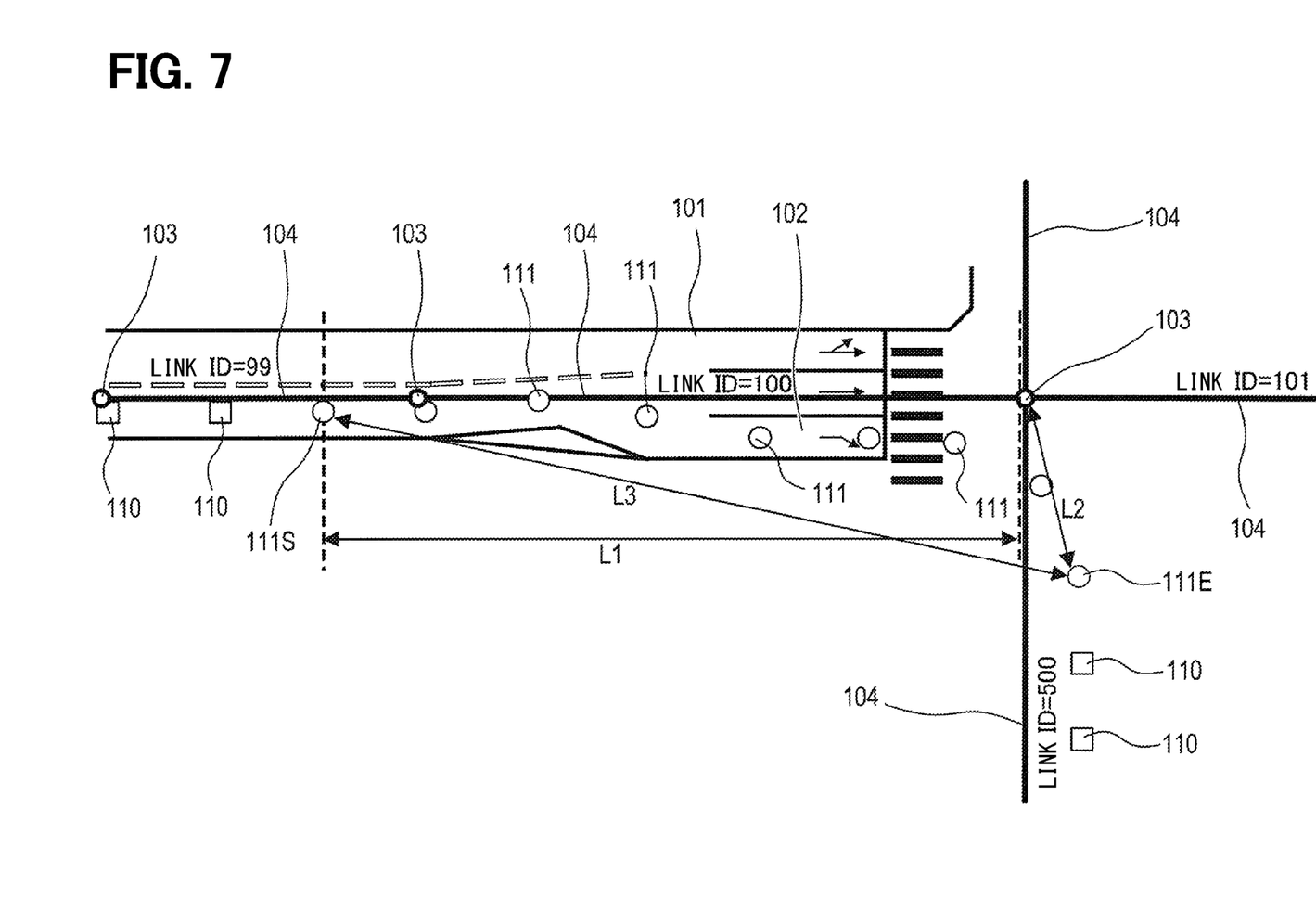
FIG. 7 is a diagram for describing a method for calculating a straight-line distance between two locations where a vehicle has traveled with a direction indicator in an operational state.

In FIG. 7, a plot 110 depicted with a square and a plot 111 depicted with a circle each represent information of a location of the vehicle, that is, information of the latitude and longitude. Movement of the plots signifies change in location of the vehicle over time. The plot 111, which is depicted with a circle, indicates that the direction indicator is in the operational state at the point in time of the particular plot 111. Here, multiple plots 111 that correspond to one right turn are considered as a group. The plots may also be referred to simply as a group hereinafter.

A link end point 103 is set at the intersection. The straight-line distance described above is a distance L1 between the link end point 103 of the intersection and the plot 111 at which the operational state of the direction indicator is started (hereinafter referred to as plot 111S) with regard to a traveling direction of the road.

First, the latitude and longitude of a plot 111 at which the operational state of the direction indicator is ended (hereinafter referred to as plot 111E) are compared to those of a link end point 103 that has been passed the last. This allows determination as to whether a right turn has been made. Then, the distance L1 is calculated, where the distance L1 is from the link end point 103 at which the right turn has been made at the intersection, that is, the link ID corresponding to the location of the vehicle has changed, to the plot 111S.

The straight-line distance L1 described above in association with one group of the plots 111 is calculated in this manner. In S21, direction indicator information related to the right turn in the intersection is acquired from multiple pieces of probe information acquired in the first period, and the straight-line distance described above is calculated for each of right turns made by the vehicles.

While a case of right turns has been described, similar processing is performed for left turns.

The CPU 21 eliminates in S22 a straight-line distance L1 that is noise, by filtering. It is determined whether a straight-line distance L1 is noise, based on at least one of whether a time over which the direction indicator is in the operational state is within a predetermined range, whether a distance over which the direction indicator is in the operational state is within a predetermined range, and whether a location at which the operational state of the direction indicator is ended is within a predetermined range. In other words, probe information that satisfies a condition that includes at least one selected from among them is used to detect a change of the dedicated lane. Specific examples of the filtering are described in (i) to (v) below.

(i) When the number of times passage is made on the road 101 is small, a change of a lane at an intersection of the road 101 falls outside the scope of analysis. The number of times passage made on the road 101 may be determined from link IDs, traveling directions, and the number of groups for right and left turns, which are acquired from the probe information. To detect a statistical change, the number of times passage made on a road needs to be of certain magnitude. If the number is too small, the probability of erroneous detection increases.

(ii) If the time over which the direction indicator is in the operational state is not within a predetermined range for a certain group, that is, if the interval from the time when the plot 111S is acquired to the time when the plot 111E is acquired is not within the predetermined range, the straight-line distance L1 related to this particular group is eliminated. This is for eliminating data that does not fit a general pattern of activation of the direction indicator for a right or left turn made at an intersection during normal travel.

(iii) If a straight-line distance L1 between the location at which the operational state of the direction indicator is started and a link end point of an intersection at which a right or left turn is presumably made is not within a threshold value range for a certain group, the straight-line distance L1 related to this particular group is eliminated. That is, an extremely long straight-line distance L1 and an extremely short straight-line distance L1 are eliminated. This is for eliminating data that does not fit a pattern of activation of the direction indicator for a right or left turn made at an intersection during normal travel.

(iv) If a straight-line distance L2 between the last location at which the direction indicator is in the operational state and a link end point at which a right or left turn is presumably made is not equal to or smaller than a threshold value for a certain group, a straight-line distance L1 related to this particular group is eliminated. This is because deactivation of the direction indicator at a location far away from the link end point is likely to indicate a move other than a right or left turn at an intersection, such as a lane change. Another reason is that a right or left turn at an intersection cannot be determined only from a change of a link ID when link connection relation data and the like are not retained.

(v) If a difference between a straight-line distance L3 from a location at which the operational state of the direction indicator is started to the last location at which the direction indicator is in the operational state and a straight-line distance L1 from the location at which the operational state of the direction indicator is started to a link end point at which a right or left turn is presumably made is not equal to or greater than a threshold value for a certain group, the straight-line distance L1 for this particular group is eliminated. This is because if the direction indicator is deactivated at a location before the link end point, the probability of a move other than a right or left turn at an intersection increases. Specifically, this is for eliminating a right or left turn made for entering a building located immediately before an intersection, such as when entering a parking space for a gas station, convenience store, or the like.

The filtering is not limited to those described above. For example, a condition that the location at which the operational state of the direction indicator is started is within a predetermined range, in other words, the straight-line distance L1 described above is within a predetermined range may be used to determine that a straight-line distance L1 is not noise. Additionally, the link end point used as a reference for distance determination is a mere example of a reference point, and other references may be used.

The CPU 21 compares in S23 a straight-line distance L1 based on the probe information acquired in the first period and a straight-line distance L1 calculated in the second period, which is a different term from the first period, and determines whether the difference between the two is equal to or greater than a threshold value. A conceivable specific method may be to compare an arithmetic mean value of the straight-line distances L1 from one of the periods to that from the other period. The method of comparison is not limited to this, and various other methods may be used. For example, median values of straight-line distances acquired in each of the periods may be compared to each other. The threshold value may be set to, for example, 1.5 times a mean distance of the second period for a road with no dedicated right or left turn lane. It may be set to 0.6 times a mean distance of the second period for a road with an existing dedicated right or left turn lane.

If it is determined in S23, based on the comparison between the straight-line distance L1 of the first period and that of the second period, that the difference between the two is equal to or greater than the threshold value, the processing moves on to S24 where the CPU 21 outputs information that a change of a lane has been detected. That is, if, for example, the mean of the straight-line distances described above for the right turn has increased to an extent that the difference exceeds the threshold value for a road with no dedicated right turn lane, the CPU 21 outputs information that a dedicated right turn lane has been added. If, for example, the mean of the straight-line distances has reduced to an extent that the difference exceeds the threshold value for a road with a right turn lane, the CPU 21 outputs information that the right turn lane has been removed. With reference to FIG. 5, the update section 38 updates in S14 the high precision map 26 based on this output. The change point detection processing in FIG. 6 is then finished.

If it is determined in S23, based on the comparison between the straight-line distance L1 of the first period and that of the second period, that the difference between the two is not equal to or greater than the threshold value, the processing moves on to S25 where the CPU 21 outputs information that a change of a lane has not been detected. Then, the change point detection processing in FIG. 6 is finished.

1-3. Effects

The first embodiment described above in detail produces the following effects.

(1a) The information processing system 1 performs the change point detection processing periodically and thus can automatically and swiftly update information on specific features necessary for automated driving.

(1b) The information processing system 1 can detect addition and removal of a dedicated right turn lane and a dedicated left turn lane as the specific features.

2. SECOND EMBODIMENT

2-1. Difference from the First Embodiment

A second embodiment has a basic configuration similar to that of the first embodiment. The difference between the two is described below. Symbols identical with those in the first embodiment indicate identical elements, for which the foregoing description should be referenced.

In the first embodiment described above, a configuration for detecting a change of a dedicated right or left turn lane has been described as an example. In the second embodiment, an information processing apparatus 11 detects a change of a traffic light. A change of a traffic light here signifies a change in state of the traffic light in terms of whether the traffic light is in a state that allows the performance of its function, such as addition or removal of a traffic light and interruption or resumption of the operation of a traffic light. A change of at least any of the situations described above is detected.

2-2. Processing

In the present embodiment, a change of a traffic light is detected by using information related to stopping and moving of the vehicles on a predetermined road, out of the probe information. An information processing system 1 according to the second embodiment performs the detection of a change of a traffic light every month. That is, the previous month correspond to the first term, and the month before the previous month corresponds to the second term.

Figure 8:
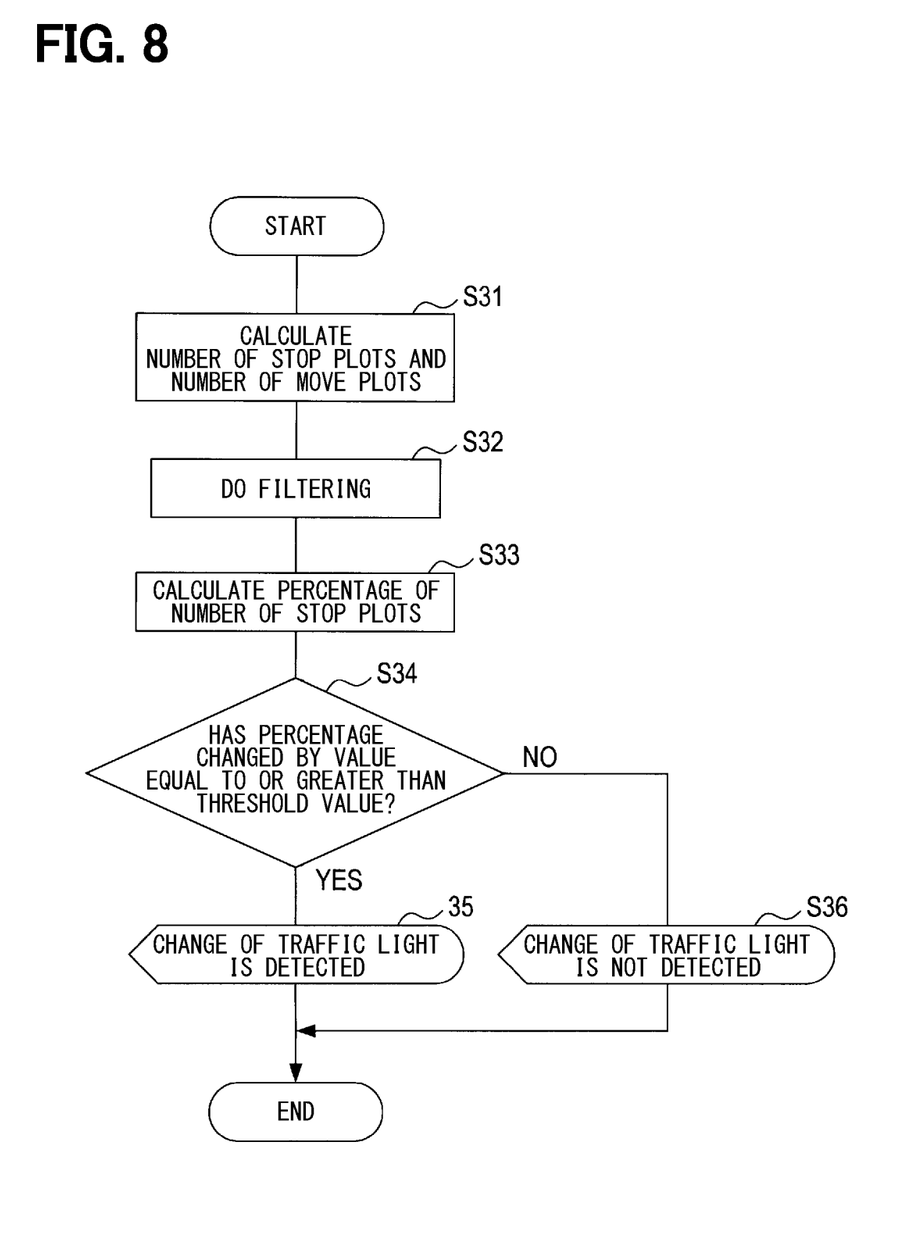
FIG. 8 is a flowchart for change point detection processing according to a second embodiment.

Change point detection processing performed, in place of the change point detection processing according to the first embodiment in FIG. 6, by the information processing system 1 according to the second embodiment is described below with reference to a flowchart in FIG. 8.

Figure 9:
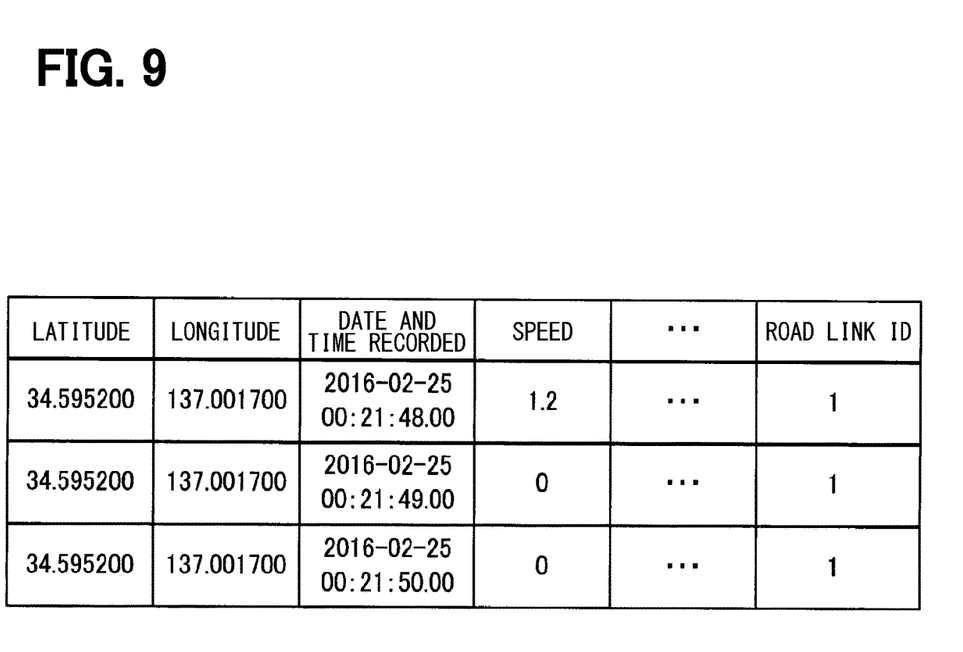
FIG. 9 is a diagram of an example of probe information.

A CPU 21 calculates in S31 the number of stop plots and the number of move plots for each link ID. A stop plot here refers to a piece of probe information in which the speed is zero, where the probe information is divided at each time of measurement. A move plot refers to a piece of probe information in which the speed is not zero. The probe information is recorded, for example, as in FIG. 9, in which case, the speed is acquired every one second. The number of stop plots and the number of move plots are calculated for each link ID based on the probe information as described above.

The CPU 21 eliminates in S32 a piece of the probe information that is noise by filtering. It is determined whether a piece of the probe information is noise, based on at least one of whether a time over which the vehicle is stopped is within a predetermined range, whether a frequency with which a stopped state and a moving state of the vehicle transition to each other is within a predetermined range, whether a hazard lamp is not in an operational state, and whether accuracy of map matching is equal to or greater than a predetermined threshold value. In other words, probe information that satisfies a condition that includes at least one selected from among them is used to detect a change of a traffic light. Specific examples of the filtering are described in (i) to (v) below.

(i) If the time over which the vehicle is stopped is long, the probability of stopping at a business office, loading and unloading, a rest, a traffic jam, or the like is high. A corresponding piece of the probe information falls outside the scope of consideration. For example, a threshold value may be set to one minute and thirty seconds and a plot related to a stop that lasts a length equal to or greater than the threshold value may be eliminated.

(ii) If the time over which the vehicle is stopped is short, the probability of a traffic jam or tollbooth is high. A corresponding piece of the probe information falls outside the scope of consideration. For example, a threshold value may be set to thirty seconds and a piece of the probe information related to a stop that lasts a length equal to or smaller than the threshold value may be eliminated.

(iii) If the hazard lamp of the vehicle is in the operational state, the probability is high that the vehicle is stopped for reasons other than the traffic signal even if the speed is zero. A corresponding piece of the probe information falls outside the scope of consideration.

(iv) If the accuracy of map matching is low, it is highly likely that the vehicle has moved off the road to a work area or a parking space. A corresponding piece of the probe information falls outside the scope of consideration.

(v) If the stopped state and the moving state of the vehicle transition to each other frequently, there is a probability of a traffic jam. A corresponding piece of the probe information falls outside the scope of consideration.

Whether to apply each filter described above, or the threshold value for each filter may be adjusted according to the type of road.

The CPU 21 calculates in S33 the percentage of the number of stop plots with regard to the total number of stop plots and move plots.

The CPU 21 determines in S34 whether the percentage calculated in S33 has changed by a value equal to or greater than a predetermined threshold value. This determination is performed by comparing the percentage described above acquired in the month before the previous month and the percentage acquired in the previous month for each road link. The threshold value may be, for example, five times or one fifth.

Here, the percentage of the number of stop plots described above in the month before the previous month is an example of the second index, and that in the previous month is an example of the first index.

If it is determined in S34, based on the comparison with the percentage of the month before the previous month, that the difference from the month before the previous month is equal to or greater than the threshold value, the processing moves on to S35 where the CPU 21 outputs information that a change of a traffic light has been detected. That is, if, for example, the percentage described above is equal to or greater than five times that of the month before the previous month, the CPU 21 outputs information that a traffic light has been added. If, for example, the percentage described above is equal to or smaller than one fifth of that of the month before the previous month, the CPU 21 outputs information that a traffic light has been removed. The update section 38 updates the high precision map 26 based on this output. The change point detection processing in FIG. 8 is then finished.

If it is determined in S34, based on the comparison with the percentage of the month before the previous month, that the difference from the month before the previous month is not equal to or greater than the threshold value, the processing moves on to S36 where the CPU 21 outputs information that a change of a traffic light has not been detected. Then, the change point detection processing in FIG. 8 is finished.

2-3. Effects

The second embodiment described above in detail produces the effect (1a) of the first embodiment described above. Additionally, addition and removal of a traffic light can be detected in the present embodiment.

3. THIRD EMBODIMENT 3-1. Difference from the First Embodiment

A third embodiment has a basic configuration similar to that of the first embodiment. The difference between the two is described below. Symbols identical with those in the first embodiment indicate identical elements, for which the foregoing description should be referenced.

In the third embodiment, an information processing apparatus 11 detects a change of a road sign, such as addition, change of information, and removal thereof.

In the present embodiment, an in-vehicle device 12a has a function of a driving recorder and transmits image data to the information processing apparatus 11 as probe information. The image data includes the outside of the vehicle captured therein. A plurality of series of image data captured as time elapses is referred to as moving image data and image data included therein is referred to as still image data, hereinafter.

Here, the image does not have to be captured by a device having the same function as that of what is called a driving recorder, as long as the image includes the outside of the vehicle captured therein. For example, a configuration for capturing images at a time interval longer than that of a moving image (for example, three seconds) and transmitting the captured images to the information processing apparatus 11 may be used in place of a configuration for capturing images consecutively as in capturing a moving image.

3-2. Processing

In the present embodiment, a change of a road sign is detected by using an image including the outside of the probe car 12 captured therein, out of the probe information.

An information processing system 1 according to the third embodiment performs the detection of a change of a road sign every month as in the second embodiment. A change of a sign here refers to addition, removal, change of information, and the like of the road sign.

Figure 10:
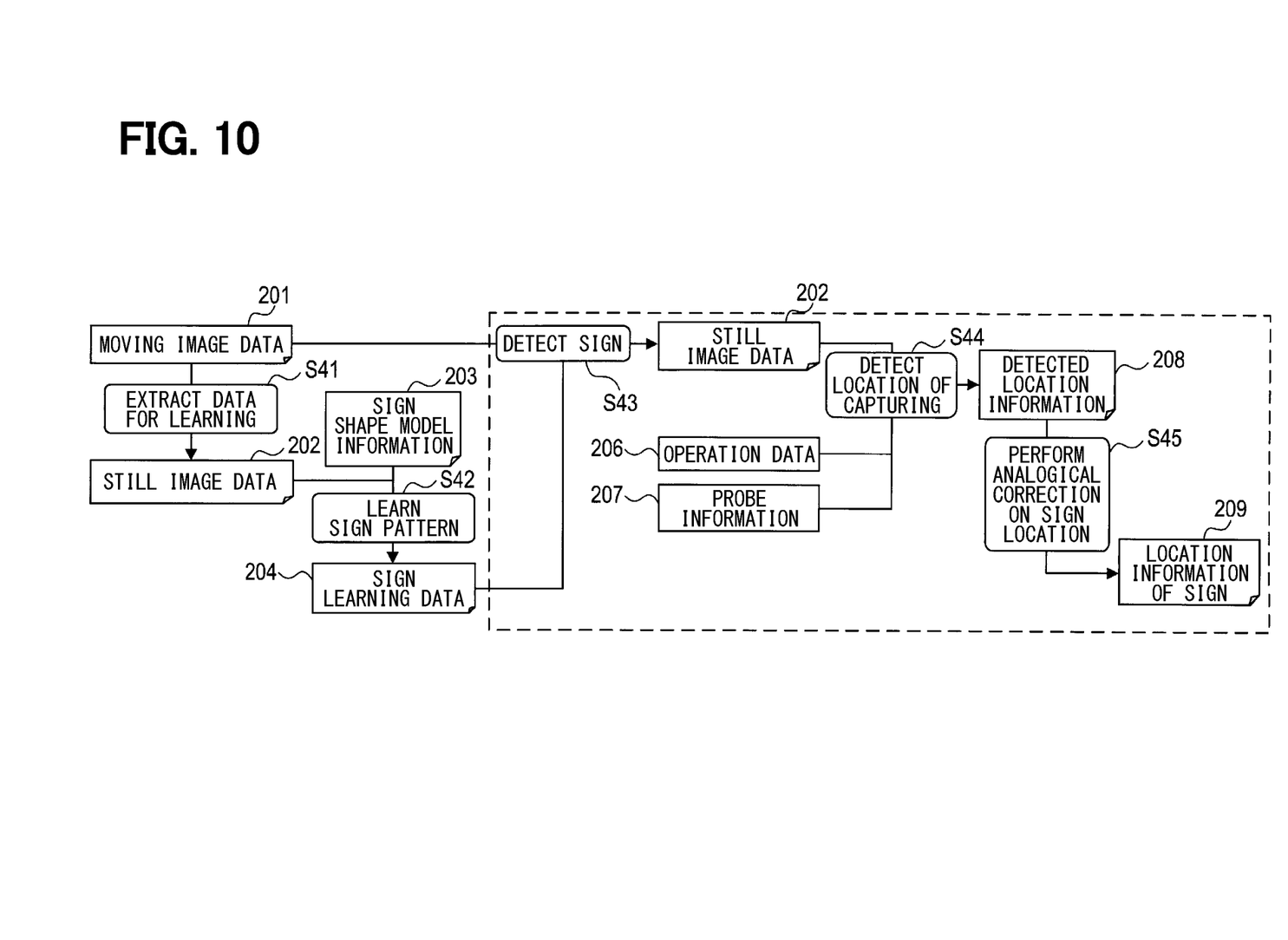
FIG. 10 is a diagram for describing processing of sign recognition according to the second embodiment.

Processing of sign recognition for recognizing a road sign from moving image data is described with reference to FIG. 10. Since there are more than one type of road sign, the processing described below may be performed for each of the signs.

A CPU 21 of the information processing apparatus 11 extracts in S41 data for learning from moving image data 201. Specifically, still image data 202 including a road sign captured therein is selected and extracted from the moving image data 201. The still image data 202 that is extracted is the data for learning.

The CPU 21 performs in S42 sign pattern learning from the data for learning, which is extracted in S41, and sign shape model information 203 and creates sign learning data 204 for the detection of the road sign.

Here, S41 and S42 represent a portion of the processing that is performed before change point detection for the high precision map 26. A portion of the processing in and after S43 is for detecting a change related to the road sign, based on the moving image data 201 acquired from the probe car 12.

The CPU 21 performs in S43 the detection of the road sign, based on the moving image data 201 and the sign learning data 204. A piece of the still image data 202 from which the road sign is detected is classified by sign and is stored.

There is operation data that corresponds to the moving image data 201. The operation data includes information of a location and time at which each piece of the still image data 202 is captured.

The CPU 21 detects in S44 a location at which the piece of the still image data 202 detected in S43 is captured based on the operation data 206 and probe information 207.

Figure 11:
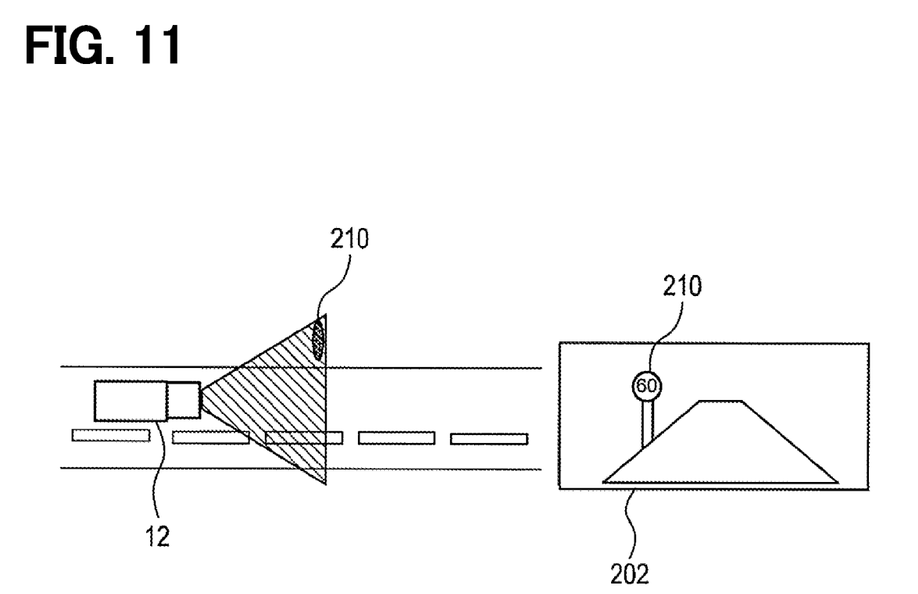
FIG. 11 is a diagram for describing a location error of a road sign.

Analogical correction of the location of the road sign is performed in S45 based on detected location information 208, which is information output in S44 of the location of capturing. As illustrated in FIG. 11, the location of capturing acquired in S44 is a location of the probe car 12; thus, it is not the same as that of the road sign 210 included in the piece of the still image data 202 and is at a distance from the location of the road sign 210. This distance is corrected based on the size of the road sign 210 in the piece of the still image data 202, that is, the number of pixels of a portion of the road sign, the location of the portion of the road sign in the piece of the still image data 202, the driving speed of the probe car 12 at the time of capturing, and the like. Location information 209 of the road sign is acquired in this manner.

Through the processing from S43 to S45, a road sign 210 shown in an image and its location are identified from a certain piece of the moving image data 201.

Figure 12:
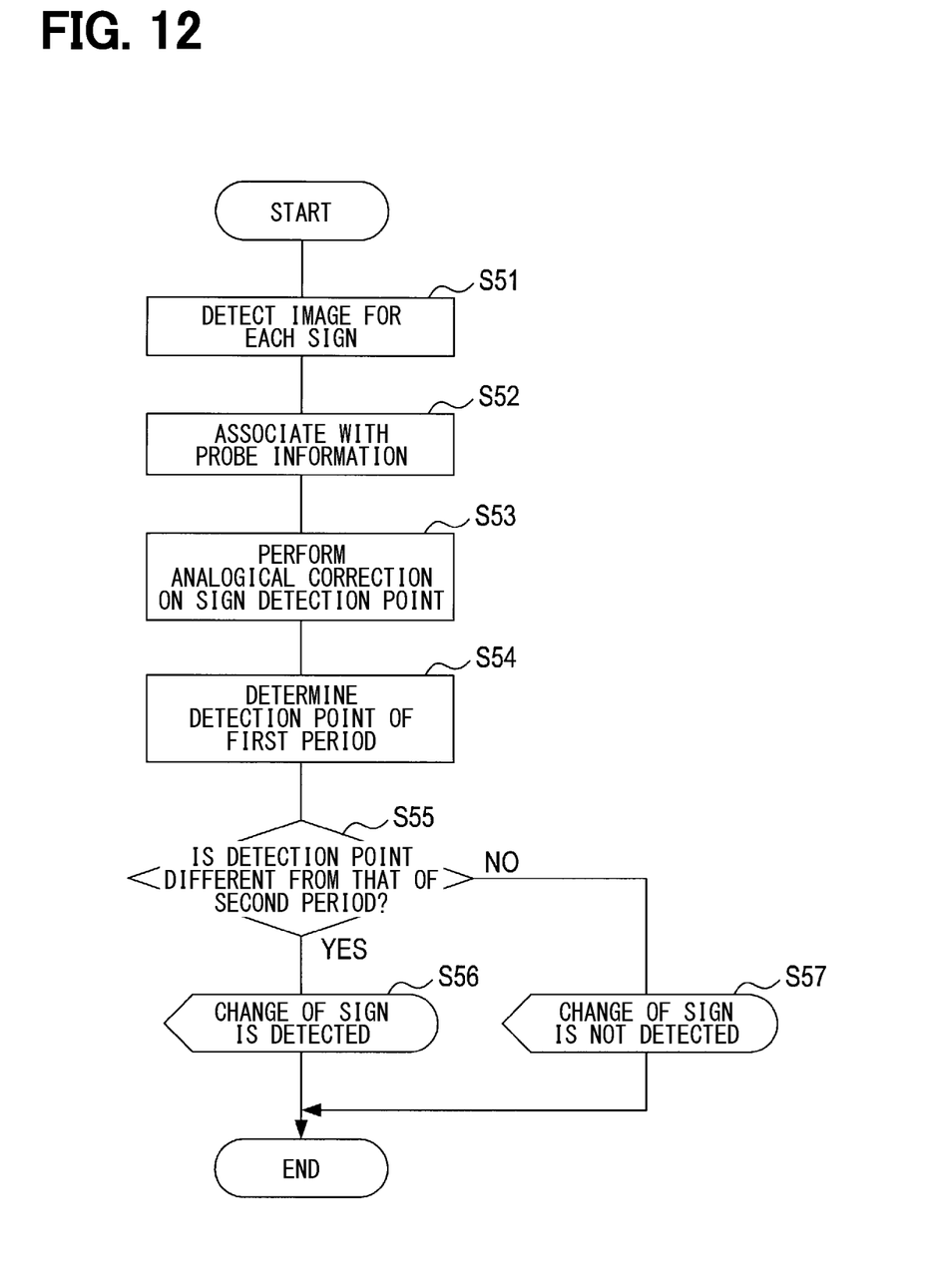
FIG. 12 is a flowchart for change point detection processing according to a third embodiment.

Change point detection processing performed, in place of the change point detection processing according to the first embodiment in FIG. 6, by the information processing system 1 according to the third embodiment is described below with reference to a flowchart in FIG. 12.

The CPU 21 detects in S51 a piece of the still image data 202 that includes a road sign captured therein from a plurality of pieces of the moving image data 201 acquired in the first period, for each sign. A plurality of still images including a road sign present on a target road is acquired in this manner.

The CPU 21 associates in S52 the pieces of the still image data 202 acquired in S51 with the probe information.

The CPU 21 performs in S53 the analogical correction on a sign detection point using the method described in S45.

The CPU 21 determines in S54 a sign detection point for the entire first period. That is, the type and location of the road sign are determined based on the number of signs detected at the location, in other words, the number of pieces of the still image data 202 that include the road sign captured therein, the likelihood of the road sign, and the like. The sign detection point of the first period is an example of the first index.

The CPU 21 determines in S55 whether the sign detection point of the first period is different from a sign detection point of the second period. The sign detection point of the second period is an example of the second index.

If it is determined in S55, based on the comparison with the detection point of the second period, which is the month before the previous month, that the detection point is different from that of the second period, the processing moves on to S56 where the CPU 21 outputs information that a change of a road sign has been detected. Specifically, the location and information of a new sign, removal of a road sign, or other information is output. The update section 38 updates the high precision map accordingly. The change point detection processing in FIG. 12 is then finished.

If it is determined in S55 that there is no difference in road sign between the second term and the first term, the processing moves on to S57 where the CPU 21 outputs information that a change of a road sign has not been detected. Then, the change point detection processing in FIG. 8 is finished.

3-3. Effects

The third embodiment described above in detail produces the effect (1a) of the first embodiment described above. Additionally, addition, change of information, and removal of a road sign can be detected in the present embodiment.

4. OTHER EMBODIMENTS

While some embodiments of the present disclosure have been described, the present disclosure is not limited to the embodiments described above and may be modified in various manners.

(4a) While examples are described in the embodiments described above where the information processing apparatus 11 detects a change of dedicated right and left turn lanes, a change of a traffic light, and a change of a road sign, other features may be detected.

(4b) The methods of determining a change of a dedicated lane, a traffic light, and a road sign described as examples in the foregoing embodiments are not limited to the examples described in the embodiments.

For example, while an example has been described in the first embodiment where a change of a dedicated lane is detected using, as an index, a straight-line distance between two locations where the vehicle has traveled with the direction indicator in the operational state, an index other than the straight-line distance described above may be employed as long as the index enables determination of the state of the direction indicator resulting from the presence or absence of the dedicated lane.

Additionally, while a change of a dedicated lane is detected based on the state of the direction indicator in the example described in the first embodiment, a change of a dedicated lane may be detected based on an operation on the steering wheel or brake performed due to addition of a dedicated lane.

While an example has been described in the second embodiment where a change of a traffic light is detected using, as an index, the percentage of the number of stop plots, an index other than the percentage described above may be used as long as the index enables determination of moving and stopping states that result from the placement of a traffic light.

A change of a traffic light is detected based on probe information related to stopping and moving in the example described in the second embodiment. Alternatively, a change of a traffic light may be detected based on probe information related to other information. For example, probe information related to a brake operation, an accelerator operation, a following distance, an image of a brake lamp of a preceding vehicle, and the like that result from the placement of a traffic light may be used.

(4c) Examples where a change of a specific feature is detected by performing the change point detection processing at a predetermined cycle have been described in the foregoing embodiments. Note that the timing at which the detection is performed is not limited to the timing according to the embodiments described above. For example, the detection may be performed when a certain number of probe cars 12 have passed the road. Additionally, the first period and the second period are not particularly limited and may be set to various other periods.

(4d) While filtering is performed so that only probe information that satisfies multiple conditions is used in the examples described in the first and second embodiments, filtering may be performed by determining only a portion of the conditions described as examples. Alternatively, filtering may be performed using other conditions. For example, probe information acquired in the rain or during night may be excluded based on weather information or time information.

The information processing apparatus 11 may be configured to perform no filtering. The information processing apparatus 11 may be configured to perform filtering also in the third embodiment. For example, filtering may be performed based on the weather information or time information described above.

(4e) Multiple functions served by a single constituent element in the embodiments described above may be served by multiple constituent elements. A single function served by a single constituent element may be served by multiple constituent elements. Multiple functions served by multiple constituent elements may be served by a single constituent element. A single function served by multiple constituent elements may be served by a single constituent element. A part of the configurations in the embodiments described above may be omitted. At least a portion of the configuration of one of the embodiments described above may be added to that of another one of the embodiments described above or replace that of the other one of the embodiments described above. Every aspect included in engineering ideas identified from the wording included in the disclosure represent embodiments of the present disclosure.

(4f) The present disclosure may be also achieved in various forms other than the information processing apparatus 11 described above, such as the information processing system 1 that includes the information processing apparatus 11 as a constituent element, a program for causing a computer to function as the information processing apparatus 11, and a non-transitory tangible storage medium, such as a semiconductor memory, having the program recorded therein.

What is claimed is:

1. An information processing apparatus that is communicable with a plurality of in-vehicle devices installed in a plurality of vehicles, the information processing apparatus comprising a processor and memory configured to:
    detect a change of a specific feature at every predetermined timing based on probe information acquired by the in-vehicle devices that indicates an operational state of a direction indicator, the specific feature being a feature on a road, including a dedicated lane for a right or left turn, and used in control of automated driving;
    calculate a first index that is an index related to a situation of the specific feature, based on the probe information acquired from the plurality of in-vehicle devices installed in the plurality of vehicles in a first period;
    calculate a second index that is an index related to a situation of the specific feature, based on the probe information acquired from the plurality of in-vehicle devices installed in the plurality of vehicles in a second period that is earlier than the first period;
    detect a change of the specific feature by comparing the first index and the second index; and
    detect a change of the dedicated lane by using the probe information that indicates the operational state of the direction indicator;
    wherein the information processing apparatus is a server apparatus located outside of the plurality of vehicles and configured to be capable of communicating with the plurality of in-vehicle devices.

2. The information processing apparatus according to claim 1, wherein:
    the specific feature is a dedicated lane for a right or left turn; and
    the processor and memory are further configured to detect a change of the dedicated lane by using the probe information that indicates an operational state of a direction indicator.

3. The information processing apparatus according to claim 2, wherein:
    the processor and memory are further configured to detect the change of the dedicated lane by using the probe information that satisfies a condition including at least one of
        a time over which the direction indicator is in the operational state being within a predetermined range,
        a distance over which the direction indicator is in the operational state being within a predetermined range,
        a location at which the operational state of the direction indicator is started being within a predetermined range, and
        a location at which the operational state of the direction indicator is ended being within a predetermined range.

4. The information processing apparatus according to claim 1, wherein:
    the specific feature is a traffic light; and
    the processor and memory are further configured to detect a change of the traffic light by using the probe information that is related to stopping of the vehicles on a predetermined road.

5. The information processing apparatus according to claim 4, wherein:
    the processor and memory are further configured to detect the change of the traffic light by using a piece of information that is related to stopping of a corresponding one of the vehicles and satisfies a condition including at least one of
        a time over which the corresponding one of the vehicles is stopped being within a predetermined range,
        a frequency with which a stopped state and a moving state of the corresponding one of the vehicles transition from each other being within a predetermined range,
        a hazard lamp not being in an operational state, and
        accuracy of map matching being equal to or greater than a predetermined threshold value.

6. The information processing apparatus according to claim 1, wherein:
    the specific feature is a road sign;
    the probe information includes an image in which outside of each of the vehicles is captured; and
    the processor and memory are further configured to detect a change of the road sign by using the image.

7. The information processing apparatus according to claim 1, wherein the processor and memory are further configured to distribute information related to the change of the specific feature detected by the detection section to a control apparatus that controls automated driving of a vehicle.

8. An information processing system, comprising:
    the information processing apparatus according to claim 1;
    wherein the information processing apparatus receives probe information at every predetermined timing.

9. An information processing apparatus comprising:
    a processor that is connected with a memory, and is configured to detect a change of a specific feature at every predetermined timing based on probe information acquired by in-vehicle devices that indicate an operational state of a direction indicator, the specific feature being a feature on a road, including a dedicated lane for a right or left turn, and used in control of automated driving,
    wherein:
    the information processing apparatus is communicable with at least one in-vehicle devices respectively installed in at least one vehicle; and
    the processor is configured to
        calculate a first index that is an index related to a situation of the specific feature, based on the probe information acquired from the in-vehicle devices installed in the at least one vehicle in a first period,
        calculate a second index that is an index related to a situation of the specific feature, based on the probe information acquired from the in-vehicle devices installed in the at least one vehicle in a second period that is earlier than the first period,
        detect a change of the specific feature by comparing the first index and the second index, and
        detect a change of the dedicated lane by using the probe information that indicates an operational state of a direction indicator;
    wherein the information processing apparatus is a server apparatus located outside of the at least one vehicle and configured to be capable of communicating with the at least one vehicle.

* * * * *